United States Patent Office 3,524,721
Patented Aug. 18, 1970

3,524,721
CATALYST COMPOSITION
Ruth E. Stephens, Detroit, Mich., assignor to Ethyl Corporation, New York, N.Y., a corporation of Virginia
No Drawing. Filed Dec. 22, 1967, Ser. No. 692,666
Int. Cl. B01d 47/00; B01j 11/40
U.S. Cl. 23—2
9 Claims

ABSTRACT OF THE DISCLOSURE

Nitrogen oxides are decomposed by contacting a catalyst consisting essentially of nickel oxide promoted with metals having an atomic number from 56 through 62 in an oxide form. Preferred promoters are neodymium oxide or neodymium oxide plus barium oxide. The catalysts are useful in reducing nitric oxide content in exhaust gas of internal combustion engines.

BACKGROUND

The exhaust gas of internal combustion engines contains unburned hydrocarbons, carbon monoxide, nitrogen oxides and oxygen, among other materials. Investigators have reported that nitrogen oxides in the presence of sunlight lead to ozone formation and that ozone reacts with hydrocarbon substituents in the atmosphere to form noxious materials. Therefore, extensive research has been carried out directed at means of removing the precursor materials, nitrogen oxides and hydrocarbons, from the atmosphere. The present invention describes catalysts and methods of using these catalysts to reduce the oxides of nitrogen content of the atmosphere by contacting exhaust gas of internal combustion engines or other exhaust gases containing oxides of nitrogen with these catalysts.

SUMMARY

This invention relates to catalysts that are eminently useful in decomposing oxides of nitrogen. In particular, this invention relates to catalysts consisting essentially of nickel oxide promoted with a metal having an atomic number from 56 through 62 in an oxide form on a suitable support.

An object of this invention is to provide catalysts useful for decomposing nitrogen oxides. These catalysts can be used for reducing the nitrogen oxide content of the exhaust gas of internal combustion engines or in reducing the nitrogen oxide content of other effluent exhaust streams containing nitrogen oxides. An example of such a stream is the effluent gas from a plant manufacturing nitric acid from ammonia.

The objects of this invention are accomplished by providing a catalyst consisting essentially of from about 0.1 to 10 weight percent nickel oxide and a promoter selected from the group consisting of metals having an atomic number from 56 through 62 in an oxide form on a suitable support.

In one preferred embodiment the catalyst consists essentially of from about 1 to 10 weight percent nickel oxide and from about 0.01 to 10 weight percent neodymium oxide on a suitable support. In another preferred embodiment the catalyst consists essentially of from about 1 to 10 weight percent nickel oxide, from about 0.01 to 10 weight percent neodymium oxide and from about 0.01 to 10 weight percent barium oxide on a suitable support.

Examples of suitable supports include zirconia, alumina-zirconia, calcium aluminate, alumina-titania, alumina, magnesia, alumina-magnesia, silica, silica-alumina, silica-magnesia, silicon carbide, zinc oxide, mullite, silica-zirconia, synthetic and natural zeolites, kaolin, silica-titania, magnesia-zirconia, magnesia-titania, zirconia-titania, alumina-silica-magnesia, alumina-silica-zirconia, alumina-silica-titania, alumina-magnesia-zirconia, alumina-magnesia-titania, alumina-zirconia-titania, silica-magnesia-zirconia, silica-magnesia-titania, silica-zirconia-titania, magnesia-zirconia-titania, and mixtures of these support materials.

In a highly preferred embodiment the support material comprises a substantial amount of zirconia. By a substantial amount is meant above about 50 percent. The balance may be other typical support materials. An especially useful support is zircon, which contains about 60 percent zirconia and 30 percent silica—the balance being mainly alumina with minor impurities.

Promoter metals having an atomic number between 56 and 62 are barium, lanthanum, cerium, praseodymium, neodymium, promethium and samarium. As stated previously, these promoters are generally present in their oxide form. They can be used individually or as mixtures. Examples of some promoter combinations are barium-neodymium, barium-lanthanum, lanthanum-cerium, lanthanum-neodymium, lanthanum-neodymium-cerium, barium-lanthanum-cerium, lanthanum - neodymium - cerium-samarium, and the like.

The catalysts can be prepared by any one of many methods known to catalyst manufacturers. A suitable support can be merely impregnated with a solution of a soluble salt of nickel and one or more promoter metals. Examples of such salts include neodymium nitrate, neodymium acetate, nickel nitrate, nickel acetate, nickel ammonium chloride, nickel formate, barium nitrate, lanthanum nitrate, lanthanum chloride, cerium acetate, cerium bromide, cerium nitrate, praseodymium-ammonium sulfate, praseodymium chloride, praseodymium nitrate, samarium acetate, samarium chloride, and barium acetate. After impregnation the support is calcined to decompose the salts to their oxide form.

Another method of preparation is to mix nickel oxide and a promoter metal oxide with a precursor of the support material. For example, an alumina gel can be formed by adding sodium hydroxide to an acidic solution of an aluminum salt such as aluminum nitrate dissolved in aqueous nitric acid in neodymium oxide, nickel oxide and optionally barium oxide can be mixed with this gel in the proper amount, forming a paste which is then extruded, dried and calcined to a temperature of about 700° C., resulting in a suitable catalyst. Likewise, other support materials may be commingled in the above process such as kaolin, silica and zirconia.

In a similar manner, the neodymium and nickel salts and optionally the barium salt may be in solution with a water-soluble aluminum salt such as aluminum nitrate and the mixture co-precipitated with the alumina gel by adding sodium hydroxide. The resulting gel can be extruded, dried and calcined, or may be mixed with other dry support material such as kaolin, silica, zirconia, and the like, forming a paste, which is extruded, dried and calcined, resulting in an effective catalyst.

The following examples serve to illustrate several of the methods available for preparing the promoted nickel oxide catalysts. All parts are by weight unless otherwise specified.

EXAMPLE 1

In an open vessel was placed 200 parts of water, 10 parts of barium nitrate, 30 parts of neodymium nitrate hexahydrate, and 130 parts of nickel nitrate hexahydrate. The mixture was heated and stirred until a solution formed and then 925 parts of zircon, a catalyst support comprising a substantial amount of zirconia (Zircon-Norton LZS 4045 $\%_{16}''$ spheres) was added and the mixture allowed to stand until the solution had impregnated the support. The impregnated zircon support was then dried and calcined at 700° C. for an hour, resulting in a catalyst containing 1.2 percent neodymium oxide, 3.4 percent nickel oxide and 0.6 percent barium oxide on a support comprising a substantial amount of zirconia.

EXAMPLE 2

Following the procedure of Example 1 except employing different supports and quantities of neodymium, nickel and barium salts, the following catalysts are prepared.

| Support | Neodymium oxide, percent | Nickel oxide, percent | Barium oxide, percent |
|---|---|---|---|
| Alumina | 0.01 | 10 | 0.01 |
| Silica | 0.05 | 5 | 0.1 |
| Zirconia | 0.5 | 3 | 1.0 |
| Zirconia-silica | 1.0 | 1 | 5.0 |
| Magnesia | 5.0 | 0.1 | 10.0 |
| Silica-alumina | 10.0 | 1.0 | 0.01 |

EXAMPLE 3

In an open vessel was placed 200 parts of water, 8.8 parts of neodymium nitrate hexahydrate and 145 parts of nickel nitrate hexahydrate. The mixture was stirred until a solution formed and then 925 parts of the zircon support described in Example 1 was added. After the solution had impregnated the support, it was dried and calcined at 700° C. for an hour, resulting in a catalyst containing 0.35 percent neodymium oxide and 4.0 percent nickel oxide.

EXAMPLE 4

Following the procedure of Example 3 except employing different supports and quantities of neodymium and nickel salts, the following catalysts are prepared.

| Support | Neodymium oxide, percent | Nickel oxide, percent |
|---|---|---|
| Alumina | 0.10 | 10 |
| Silica-alumina | 0.05 | 5 |
| Zirconia | 0.1 | 1 |
| Zirconia-silica | 0.5 | 5 |
| Zirconia-silica-alumina | 5 | 0.1 |
| Zinc oxide | 7 | 0.05 |
| Silica-magnesia | 10 | 1 |

EXAMPLE 5

To a mixing vessel is added 10 parts of neodymium oxide, 100 parts of nickel oxide, 700 parts of zirconia and 1000 parts of hydrated alumina (28 percent water). These materials are thoroughly mixed and then 100 parts of aqueous nitric acid containing 12 parts of 70 percent $HNO_3$ is added. Mixing is continued and a plastic mass forms due to the gelling of the hydrated alumina. This material is extruded through 3/16" dies into pieces 1/4" long. The extrudate is dried for 2 hours at 100° C. and then heated to 750° C. over a 4 hour period. The resulting catalyst consists essentially of 0.66 percent neodymium oxide and 6.6 percent nickel oxide on a zirconia alumina support.

The amount of zirconia and alumina in the above catalysts may be varied to obtain the desired physical properties in the support. Variations will require adjustments in the amount of nitric acid required to obtain the plastic gel. Also, the amounts of neodymium oxide and nickel oxide can readily be changed to give other catalyst compositions. Furthermore, barium oxide can be included in the mixture to give a catalyst consisting essentially of neodymium oxide, nickel oxide and barium oxide on a suitable support.

EXAMPLE 6

In a mixing vessel is placed 1000 parts of silica magnesia. To this is added an aqueous solution of nickel nitrate, lanthanum nitrate and praseodymium nitrate in an amount such that the final catalyst, after calcining at 700° C., consists essentially of 5.5 percent nickel oxide, 0.1 percent lanthanum oxide and 0.01 percent praseodymium oxide.

EXAMPLE 7

In a mixing vessel is placed 1000 parts of activated alumina and an aqueous solution of nickel nitrate, barium nitrate, neodymium nitrate, lanthanum nitrate and praseodymium nitrate, sufficient to cover the alumina. After standing 4 hours, the remaining water is evaporated at 100° C. and the impregnated alumina heated to 750° C. The resulting catalyst consists essentially of 3 percent nickel oxide, 3 percent barium oxide, 0.1 percent neodymium oxide, 0.15 percent lanthanum oxide, and 0.1 percent praseodymium oxide, on an activated alumina support.

EXAMPLE 8

In a mixing vessel is placed 1000 parts of zirconia and an aqueous solution of nickel nitrate and barium nitrate sufficient to cover the zirconia. After standing 8 hours, the excess water is drained off and the catalyst dried. Following this, it is calcined at 650° C. for 4 hours, resulting in a catalyst consisting essentially of 6.5 percent nickel oxide and 0.2 percent barium oxide on a zirconia support.

In order to be effective in decomposing oxides of nitrogen the catalysts of this invention should be used at an elevated temperature. Generally the temperature should be above about 400° C. before the catalysts will become active. A generally preferred temperature range is from about 400–1000° C., and a more preferred temperature range is from 700–850° C.

When using the catalysts of this invention to decompose the nitrogen oxides in the exhaust gas of an internal combustion engine, it is preferred that the engine be operated at an air/fuel ratio below about 14 in order to obtain maximum effectiveness. At leaner ratios the catalysts have been found to be less effective in reducing the amount of nitrogen oxides in the exhaust.

Tests were carried out to demonstrate the effectiveness of the catalysts of this invention in reducing the nitric oxide content of the exhaust gas from an internal combustion engine. In these tests a single cylinder 36 cubic inch spark-ignited gasoline engine was operated and the exhaust gas passed through a container in which the test catalyst was disposed. The amount of nitric oxide in the exhaust gas was measured before and after passing through the catalyst bed. In these tests employing the catalyst prepared in Example 1, a 90–95 percent reduction in the amount of nitric oxide in the exhaust gas was observed when operated employing an air/fuel ratio between 13 and 14. Comparable results were obtained when the test was carried out on the catalyst prepared as in Example 3.

In order to use the catalyst in an internal combustion engine exhaust system, the catalyst is incorporated in a suitable manner into the exhaust system of the engine. One method commonly used is to place the catalyst in a so-called "catalytic muffler." Examples of these are disclosed in U.S. Pats. 3,154,389; 3,149,925; 3,149,926 and 3,146,073, among others. Essentially these are containers having an opening to receive and discharge the exhaust gas. To firmly retain the catalyst material the receiving and discharge openings are covered with wire screen. The container may have internal baffling to allow greater contact between catalyst and exhaust gas or to use the hot reaction gases to heat the incoming exhaust gases. The container may actually replace the vehicle muffler or may be incorporated into the conventional exhaust system of current vehicles. The catalyst bed may also be located in the exhaust manifold of the engine.

The catalysts may be used by themselves, as mixtures, or they may be used in conjunction with a second catalyst whose function is to oxidize the hydrocarbon or carbon monoxide constituents of the exhaust gas. A catalyst eminently suited for this purpose is a supported copper-palladium catalyst as described in U.S. Pat. 3,224,981. The catalysts may be intimately mixed with the oxidation catalyst or the different catalysts may be stratified. When the oxidation catalyst and the catalysts of this invention are stratified so that the exhaust gas contacts each sequentially, it is preferred that the exhaust gas contact the oxidation catalyst first, because this serves to heat the exhaust gas and increase the effectiveness of the nitrogen oxide decomposing catalysts.

When used to decompose oxides of nitrogen in streams other than the exhaust stream of internal combustion engines, the catalyst is merely incorporated in the oxide of nitrogen containing stream so that intimate contact is obtained between the catalyst and the oxides of nitrogen at an elevated temperature. For example, in the discharge stream of a nitric acid plant employing the ammonia process for synthesizing nitric acid, the spent gas containing nitric oxide is passed through the catalyst bed and the temperature of the bed maintained at a temperature of from about 400 to 1000° C.

What is claimed is:

1. A catalyst suitable for decomposing oxides of nitrogen, said catalyst consisting essentially of from about 0.1 to 10 weight percent nickel oxide and a promoter selected from the group consisting of (a) metals having an atomic number from 57 through 62 in an oxide form and (b) barium oxide and metals having an atomic number from 57 through 62 in an oxide form, said catalyst being supported on a suitable support.

2. The catalyst of claim 1 consisting essentially of from about 1 to 10 weight percent nickel oxide and from about 0.01 to 10 weight percent neodymium oxide on a suitable support.

3. The catalyst of claim 2 wherein said support is selected from the group consisting of zirconia, silica, alumina, zinc oxide and mixtures thereof.

4. The catalyst of claim 3 wherein said support comprises a substantial amount of zirconia.

5. The catalyst of claim 1 consisting essentially of from about 1.0 to 10 weight percent nickel oxide, from about 0.01 to 10 weight percent neodymium oxide and from about 0.01 to 10 weight percent barium oxide on a suitable support.

6. The catalyst of claim 5 wherein said support is selected from the group consisting of zirconia, silica, alumina, zinc oxide and mixtures thereof.

7. The catalyst of claim 6 wherein said support comprises a substantial amount of zirconia.

8. A method of decomposing an oxide of nitrogen comprising contacting a gas stream containing oxides of nitrogen with a catalyst of claim 1 at a temperature above about 400° C.

9. The method of claim 8 wherein said gas stream is the exhaust gas of an internal combustion engine and wherein said catalyst consists essentially of from about 1.0 to 10 weight percent nickel oxide and from about 0.01 to 10 weight percent neodymium oxide on a support comprising a substantial amount of zirconia.

References Cited

UNITED STATES PATENTS

| | | | |
|---|---|---|---|
| 3,179,488 | 4/1965 | Appell | 23—2 |
| 3,226,340 | 12/1965 | Stephens et al. | 252—462 X |
| 3,284,370 | 11/1966 | Clifford et al. | 252—462 |
| 3,370,914 | 2/1968 | Gross et al. | 23—2 |
| 3,395,004 | 7/1968 | Taylor et al. | 252—466 X |

DANIEL E. WYMAN, Primary Examiner

C. F. DEES, Assistant Examiner

U.S. Cl. X.R.

252—455, 457, 462, 466